US011970761B2

(12) United States Patent
Yang et al.

(10) Patent No.: US 11,970,761 B2
(45) Date of Patent: Apr. 30, 2024

(54) IRON-BASED AMORPHOUS ALLOY AND PREPARATION METHOD THEREFOR

(71) Applicant: QINGDAO YUNLU ADVANCED MATERIALS TECHNOLOGY CO., LTD., Shandong (CN)

(72) Inventors: Dong Yang, Shandong (CN); Qinghua Li, Shandong (CN); Jing Pang, Shandong (CN)

(73) Assignee: QINGDAO YUNLU ADVANCED MATERIALS TECHNOLOGY CO., LTD., Shandong (CN)

( * ) Notice: Subject to any disclaimer, the term of this patent is extended or adjusted under 35 U.S.C. 154(b) by 405 days.

(21) Appl. No.: 16/482,701

(22) PCT Filed: Feb. 11, 2018

(86) PCT No.: PCT/CN2018/076206
§ 371 (c)(1),
(2) Date: Jul. 31, 2019

(87) PCT Pub. No.: WO2019/119637
PCT Pub. Date: Jun. 27, 2019

(65) Prior Publication Data

US 2020/0224298 A1 Jul. 16, 2020

(30) Foreign Application Priority Data

Dec. 21, 2017 (CN) ......................... 201711392745.7

(51) Int. Cl.
*C22C 45/02* (2006.01)
*C22C 33/00* (2006.01)
*H01F 1/153* (2006.01)

(52) U.S. Cl.
CPC ............ *C22C 45/02* (2013.01); *C22C 33/003* (2013.01); *H01F 1/15325* (2013.01); *H01F 1/15341* (2013.01); *C22C 2202/02* (2013.01)

(58) Field of Classification Search
None
See application file for complete search history.

(56) References Cited

U.S. PATENT DOCUMENTS

| | | | | |
|---|---|---|---|---|
| 4,300,950 A | | 11/1981 | Luborsky et al. | |
| 4,581,081 A | * | 4/1986 | Kroeger | C22C 45/02 420/83 |
| 6,416,879 B1 | * | 7/2002 | Sakamoto | H01F 1/15308 428/606 |
| 2014/0224446 A1 | * | 8/2014 | Song | C22C 38/00 420/583 |
| 2018/0021851 A1 | * | 1/2018 | Wong | B22D 17/14 148/538 |

FOREIGN PATENT DOCUMENTS

| | | | | | |
|---|---|---|---|---|---|
| CN | 1124362 | C | | 10/2003 | |
| CN | 1621552 | A | | 6/2005 | |
| CN | 100549205 | C | | 10/2009 | |
| CN | 102543348 | A | | 7/2012 | |
| CN | 102732811 | A | | 10/2012 | |
| CN | 102909363 | A | | 2/2013 | |
| CN | 101921972 | B | * | 5/2013 | |
| CN | 103187136 | A | | 7/2013 | |
| CN | 102337485 | B | | 12/2013 | |
| CN | 103628003 | A | | 3/2014 | |
| CN | 104032241 | A | | 9/2014 | |
| CN | 105047348 | A | | 11/2015 | |
| CN | 103302287 | B | * | 12/2015 | |
| CN | 105741998 | A | * | 7/2016 | C22C 45/02 |
| CN | 106319398 | A | | 1/2017 | |
| CN | 106636984 | A | | 5/2017 | |
| CN | 106702291 | A | | 5/2017 | |
| CN | 106906431 | A | | 6/2017 | |
| CN | 107236911 | A | | 10/2017 | |
| CN | 107267889 | A | | 10/2017 | |
| JP | S57101647 | A | | 6/1982 | |
| JP | S57185957 | A | | 11/1982 | |
| JP | H06220592 | A | | 8/1994 | |
| JP | 2002285305 | A | * | 10/2002 | H01F 1/15308 |

OTHER PUBLICATIONS

Machine Translation of JP-2002285305-A (Year: 2002).*

Kroeger et al.; Nanotubes and related nanostructures: Nov. 26-30, 2007, Boston, Massachusetts, USA; In: Materials Research Society Symposium Proceedings (MRS Proceedings); ISSN 0272-9172, 19860101 Materials Research Society, US (Year: 2007).*

Canright, G., & Kroeger, D. (1985). Magnetic Domain Structures in Cerium-Doped Fe80B20, Fe80B16Si2C2, and Fe78B13Si9 Glassy Ribbons. MRS Proceedings, 58, 159. doi: 10.1557/PROC-58-159 (Year: 1985).*

D.M. Kroeger, G.S. Canright, C.G. Mckamey, D.S. Easton, J.O. Scarbrough, Retardation of annealing embrittlement in iron-based glasses by microaddition of cerium, Acta Metallurgica, vol. 35, Issue 4, 1987, pp. 989-1000, ISSN 0001-6160, (Year: 1987).*

Machine Translation of CN-101921972-B (Year: 2013).*

Machine Translation of CN-103302287-B (Year: 2015).*

4. Canright, G., and D. Kroeger. "Effects of Microaddition of Cerium on the Magnetic Properties of Fe80B16Si2C2 Metallic Glass." IEEE Transactions on Magnetics, vol. 22, No. 3, 1986, pp. 182-187. (Year: 1986).*

(Continued)

*Primary Examiner* — Kiley S Stoner
*Assistant Examiner* — Ryan L Heckman
(74) *Attorney, Agent, or Firm* — Yue (Robert) Xu; Apex Attorneys at Law, LLP

(57) ABSTRACT

Disclosed is an iron-based amorphous alloy $Fe_aB_bSi_cRE_d$, wherein a, b, and c represent, in atomic percentages, the contents of corresponding components, respectively; 83.0≤a≤87.0, 11.0<b<15.0, 2.0≤c≤4.0, and a+b+c=100; and d is the concentration of RE in the iron-based amorphous alloy, i.e. 10 ppm≤d≤30 ppm. The iron-based amorphous alloy has a saturation magnetic induction intensity of no less than 1.63 T, and same can be used to manufacture a magnetic core material for power transformers, motors and inverters.

2 Claims, No Drawings

(56) References Cited

OTHER PUBLICATIONS

Machine Translation of CN-105741998-A (Year: 2016).*
Kroeger (Kroeger, D. M., et al. "Effects of Microadditions of Cerium on Annealing Embrittlement in FEBSI Glasses." MRS Proceedings, vol. 80, 1986, 131-136) (Year: 1986).*
International Search Report for PCT/CN2018/076206 dated Oct. 8, 2018, ISA/CN.
CNIPA First Office Action corresponding to Application No. 201711392745.7; dated Mar. 26, 2019.
D.M.Kroeger et al: "Abstract", Materials Research Society Symposium Proceedings, vol. 80, Jan. 1, 1986, XP055636091,p. 131-134.
Kroeger D M et al:"Retardation of annealing embrittlement in iron-based glasses by microaddition of cerium", Acta Metallurgica, Pergamon Press, US, vol. 35. No. 4, Apr. 1, 1987, pp. 989-1000, XP022885486, p. 991-992.
Fujikura M et al: "Improvement of magnetic properties by addition of tin to amorphous Fe—Si—B alloys with high iron contents", Materials Science and Engineering: A, Elsevier, Amsterdam, NL, vol. 181-182, May 15, 1994, pp. 1351-1354, XP024168194.
Search Report dated Nov. 6, 2019 for European patent application No. 18891889.0, 16 pages.

* cited by examiner

IRON-BASED AMORPHOUS ALLOY AND PREPARATION METHOD THEREFOR

CROSS REFERENCE TO RELATED APPLICATIONS

This application is the national phase of International Application No. PCT/CN2018/076206, titled "IRON-BASED AMORPHOUS ALLOY AND PREPARATION METHOD THEREFOR", filed on Feb. 11, 2018, which claims the priority of Chinese Patent Application No. 201711392745.7, titled "IRON-BASED AMORPHOUS ALLOY AND PREPARATION METHOD THEREFOR", filed on Dec. 21, 2017 with the China National Intellectual Property Administration, which is incorporated herein by reference in entirety.

FIELD

The present disclosure relates to the field of magnetic material technology, specifically to an iron-based amorphous alloy and a method for preparing the same.

BACKGROUND

As an excellent soft magnetic amorphous material, iron-based amorphous material has been favored by scientific researchers all over the world since its production. Due to its characters such as high magnetic permeability, low coercive force, low loss and high saturation magnetic induction intensity, it has always been favored by the industry. However, in recent years, since there has been a design demand for miniaturization, low cost, and high capacity of a transformer, it is urgently needed to increase the saturation magnetic flux density of an amorphous material as a magnetic core. This is because, on the one hand, improvement of the saturation magnetic flux density may reduce the magnetic core, and at the same time can reduce material cost of other parts of the transformer, thereby reducing the overall cost of the transformer; and on the other hand, higher saturation magnetic flux density enables a high-capacity transformer design. Based on this, researchers are continuing research on development of composition of the amorphous material with a high saturation induction.

In a Publication No. CN100549205, an amorphous alloy composition of $Fe_aSi_bB_cC_d$ is disclosed, wherein a is 76 to 83.5 atom %, b is 12 atom % or below, c is 8 to 18 atom %, and d is 0.01 to 3 atom %, wherein, the iron-based amorphous alloy strip has a saturation magnetic flux density of above 1.6 T after annealing, and the maximum is above 1.67 T. In the patent, it is illustrated in detail that controlling C and Si in a rational proportion and ensuring C segregation layer to have a peak value in the range of 2 to 20 nm can produce an iron-based amorphous alloy strip with low loss, reduced embrittlement and thermal instability. However, the requirement to distribution of the C segregation layer on the surface of the strip is relatively rigorous. As described in the text, unevenness of the depth and range of the C segregation layer in partial region of the inner strip may lead to uneven stress release, and partially cause fragile problems. To cope with the above problems, it is necessary to control the CO or $CO_2$ gas blown onto the crystallizer through a rational strip width. If the airflow is too large or too small, the range of the C segregation layer will be affected. The process is relatively complicated and the preparation is difficult.

In a Japanese Publication No. JPH06220592, an amorphous alloy thin strip represented by the formula $Fe_aCo_bSi_cB_dM_x$ is disclosed; and the atomic percents of which are: 60≤a≤83, 3≤b≤20, 80≤a+b≤86, 1≤c≤10, and 11≤d≤16, and M is at least one of Sn and Cu. In the patent, addition of Co can effectively improve the saturation magnetic induction intensity of amorphous materials; but Co is a relatively expensive element. Although the Co-containing iron-based amorphous alloy thin strip has a relatively high saturation magnetic flux density, excessive cost severely restricts mass production of the alloy material, and it is used in limited occasions where a higher quality but a less amount is required.

It is well known that increase of ferromagnetic elements is a guarantee for increasing the saturation magnetic induction intensity, thereby causing a decrease in metalloid, so that the amorphous forming ability is reduced and it is impossible to form a completely amorphous state. In view of this, a Publication No. CN1124362 discloses that a certain amount of P element is added to an alloy containing a certain amount of Fe, Si, B, C to prepare an amorphous alloy to improve amorphous forming ability of the alloy. The composition of the alloy is: 82<Fe≤90, 2≤Si<4, 5<B≤16, 0.02≤C≤4, and 0.2≤P≤12 by atom percent, and BS value after annealing is as high as 1.74 T. At the same time, alloy composition containing P has an advantage of annealing of in the examples of the patent, and addition of P can effectively improve the annealing window of the amorphous iron core. However, the patent does not mention an effective method for adding P and the requirements for P alloy raw materials. It is true that P alloy with low quality has pretty low cost, low-quality P alloy contains a variety of high melting point alloying elements such as V, Ti, and Al. These elements generate high melting point oxide in smelting process, which exists in the form of heterogeneous nucleation points in the strip, and induces crystallization of the surface of the strip, not conducive to smooth running of strip production. However, smelting process of P alloy with high quality is fairly complex, and the industrial production is difficult. The patent illustrates a possibility of P addition in amorphous alloy with a high saturation induction on the basis of composition experiments, but does not provide a reasonable illustration and explanation for industrial production.

A Japanese Patent Publication No. S57-185957 also provides a method in which B in conventional amorphous alloy is replaced with P having an atomic percent of 1 to 10%. The patent discloses that increase of P can improve the ability of forming an amorphous state, but the patent does not specifically mention an annealing process of a P-containing amorphous alloy. The P-containing amorphous strip has a very weak oxidation resistance, requiring very low oxygen content in annealing process. If it is annealed in a conventional unprotected atmosphere, it is easily oxidized. Experimental studies have shown that under an unprotected atmosphere, if the atomic percent of P is more than 1%, and the annealing temperature is about 200° C., surface of the annealed strip exhibits a light blue oxidized color. The higher the P content is, the higher the annealing temperature of the material is, and the more severe the oxidation is. A normal annealing temperature is obviously higher than 200° C., and surface of the severely oxidized strip exhibits a surface morphology of deep blue and purple. As the strip is oxidized, the core loss of the material is abnormally large. In sum, the severity of annealing heavily limits industrialization of such alloys.

SUMMARY

The technical problem solved by the present disclosure is to provide an iron-based amorphous alloy. The iron-based amorphous alloy has features of high saturation magnetic induction intensity, good soft magnetic properties and high process smooth running degree.

In view of this, the present disclosure provides an iron-based amorphous alloy as shown in formula (I), $$Fe_aB_bSi_cRE_d \quad (I);$$

wherein a, b and c respectively represent an atomic percent of corresponding components; 83.0≤a≤87.0, 11.0<b<15.0, 2.0≤c≤4.0, and a+b+c=100; and d is concentration of RE in the iron-based amorphous alloy, and 10 ppm≤d≤30 ppm.

Preferably, the saturation magnetic induction intensity of the iron-based amorphous alloy is ≥1.63 T.

Preferably, the atomic percent of Fe is 83.2≤a≤86.8.

Preferably, the atomic percent of B is 12.2≤b≤14.5.

Preferably, the atomic percent of Si is 2.5≤c≤3.5.

Preferably, RE is selected from one or more of La, Ce, Nd and Yb, and the concentration of RE is 15 ppm≤d≤25 ppm.

The present disclosure provides a method for preparing an iron-based amorphous alloy, comprising preparing raw materials according to atomic percent in the iron-based amorphous alloy of formula $Fe_aSi_bB_c$; smelting the prepared raw materials, and adding a rare earth alloy after a molten steel achieves a target temperature in the smelting process; and performing a single roller rapid quenching on the smelted molten liquid to give an iron-based amorphous alloy;

wherein the addition amount of the rare earth alloy is that concentration of the rare earth elements in the iron-based amorphous alloy is 10 ppm to 30 ppm;

wherein 83.0≤a≤87.0, 11.0<b<15.0, 2.0≤c≤4.0, and a+b+c=100.

Preferably, the target temperature is 1450 to 1500° C.

Preferably, the iron-based amorphous alloy is in a completely amorphous state, having a critical state of at least 30 μm, and a width of 100 to 300 mm.

Preferably, the method further comprises, after the single roller rapid quenching, subjecting the iron-based amorphous alloy to a heat treatment; wherein temperature of the heat treatment is 300 to 380° C., and time of the heat treatment is 30 to 150 min.

Preferably, under a condition of 50 Hz and 1.30 T, the iron-based amorphous alloy has an iron core loss of less than 0.16 W/kg; and under a condition of 50 Hz and 1.40 T, the iron-based amorphous alloy has an iron core loss of less than 0.20 W/kg.

The present disclosure provides an iron-based amorphous alloy as shown in formula $Fe_aB_bSi_cRE_d$, comprising Fe, Si, B and RE, wherein Fe, Si and B are favorable for forming an iron-based amorphous alloy having high saturation magnetic induction intensity, and RE can effectively reduce dissolved oxygen in the alloy, thereby significantly reducing the forming of other high melting point slag. The reduction of the high melting point slag can effectively decrease the casting temperature in preparing the amorphous strip, and at the same time avoid other high melting point slag accumulating at the nozzle aperture and occurring heterogeneous nucleation in the strip matrix during the temperature decreasing process. Thus, in the iron-based amorphous alloy provided by the present disclosure, due to Fe, Si, B and RE are added and the amount thereof is controlled, the iron-based amorphous alloy has advantages of high saturation magnetic induction intensity, excellent soft magnetic properties and high process smooth running degree.

DETAILED DESCRIPTION

In order to understand the present disclosure better, the preferred embodiments of the present disclosure is described hereinafter with reference to the examples of the present disclosure. It is to be understood that the description is merely illustrating the characters and advantages of the present disclosure, and is not intended to limit the claims of the present application.

In order to solve the problems occurring in the process for preparing the iron-based amorphous alloy in the prior art, the present disclosure purifies the molten steel by adding rare earth trace elements on the basis of suitable principal component design, which solves the problem on smooth running of the preparation of an amorphous alloy strip with high saturation magnetic induction intensity, thereby giving an iron-based amorphous alloy strip with high saturation magnetic induction intensity, excellent soft magnetic properties and high process smooth running degree. Specifically, the present disclosure discloses an iron-based amorphous alloy as shown in formula (I), $$Fe_aB_bSi_cRE_d \quad (I);$$

wherein a, b and c respectively represent an atomic percent of corresponding components; 83.0≤a≤87.0, 11.0<b<15.0, 2.0≤c≤4.0, and a+b+c=100; and d is concentration of RE in the iron-based amorphous alloy, and 10 ppm≤d≤30 ppm.

In the present disclosure, Fe, as a soft magnetic element, is an element ensuring the high saturation magnetic induction intensity. If the content of Fe element is unduly low, the saturation magnetic induction intensity is low, i.e., if the atomic percent a is <83%, the saturation magnetic induction intensity is lower than 1.63 T. If the content is unduly high, the amorphous forming ability of the iron-based amorphous alloy is insufficient, and the thermal stability is bad. In the present disclosure, the atomic percent of Fe is 83.0≤a≤87.0; in some embodiments, the atomic percent of Fe is 83.2≤a≤86.8; in some embodiments, the atomic percent of Fe is 85≤a≤86.6; and more specifically, the atomic percent of Fe is 83.7, 84, 84.3, 84.8, 85, 85.2, 85.6, 86.0, 86.2, 86.6 or 86.8.

B is an amorphous forming element in the iron-based amorphous alloy. In a certain range, the higher the content of B is, the stronger the amorphous forming ability is. The maximum amorphous thickness formed from a material is used as the criterion for evaluating the amorphous forming ability. The higher the content of B is, the thicker the maximum amorphous is. If the content of B is unduly low, it is more difficult to form a stable amorphous material. If the content of B is unduly high, the content of Fe is insufficient, so that it is impossible to achieve higher saturation magnetic flux density. In view of the actual production status and the basic requirements of material with a high saturation induction on high content of Fe, in the present disclosure, the atomic percent of B is 11.0<b<15.0; in some embodiments, the atomic percent of B is 11.5≤b≤14.8; in some embodiments, the atomic percent of B is 12.2≤b≤14.5; and more specifically, the atomic percent of B is 12.3, 12.6, 12.8, 13.2, 13.5, 13.8, 14.0, 14.3 or 14.5.

The atomic percent of Si is 2≤c≤4. If the content is unduly low, the formable ability of the iron-based amorphous strip and the thermal stability of the iron-based amorphous strip are reduced, and the formed amorphous strip is thermodynamics unstable; at the same time, the viscosity of alloy decreases and the molten steel becomes active, the mobility of the molten steel is improved, so that the surface tension of alloy reduces, thereby making it hard to form a stable molten liquid and the smooth running of the preparation of a strip become worse. If the content is unduly high, it is impossible to obtain an amorphous alloy strip with a higher content of Fe and a higher Bs. In some embodiments, the atomic percent of Si is 2.5≤c≤3.8; in some embodiments, the atomic percent of Si is 2.8≤c≤3.5; and more specifically, the atomic percent of Si is 2.9, 3.0, 3.2, 3.4 or 3.5.

In view of the above design direction of the compositions, it is known that for the iron-based amorphous alloy strip with a high saturation magnetic induction intensity, in order to ensure that the saturation magnetic induction intensity is not lower than the design value, content of the ferromagnetic metal element iron is required to be ensured. At the same time, content of the remaining metalloid elements needs to be reasonably designed to ensure a certain amorphous forming ability of the amorphous material with a high saturation induction. For the preparation of amorphous strips with a high saturation induction composed of only Fe, Si, and B elements, only a composition design is not enough. It is necessary to rationally optimize the strip producing process and the quality of the molten steel to improve the process formability and performance stability of the alloy strip. In the present application, by optimizing the quality of the molten steel, on the one hand, the casting temperature is lowered, and the relative cooling capacity is improved, and on the other hand, an effect of heterogeneous nucleation produced in the preparation of amorphous strip caused by high melting point slag is reduced; and adding rare earth elements in the iron-based amorphous alloy perfectly can achieve the above effects.

The rare earth element has a strong deoxidation effect, and has a remarkable effect on reducing the oxygen content of the molten steel and reducing high melting point slag. The rare earth and dissolved oxygen in the molten steel form a high melting point stable oxide, and the high melting point rare earth oxide formed by adding rare earth is partially removed by a drossing process; at the same time, a small amount of residual rare earth oxide reacts with some of the silicon dioxide in the alloy, to form silicate-like substances exhibiting an amorphous property in structure, which is consistent with the substrate structure of the strip, and which amorphous structure does not have adverse effects on the amorphous formation of the amorphous substrate. It can be seen that addition of rare earth can effectively reduce dissolved oxygen in the alloy, thereby significantly reducing the forming of other high melting point substances. The reduction of the high melting point slag can effectively decrease the casting temperature in preparing the amorphous strip, and at the same time avoid other high melting point slag accumulating at the nozzle aperture and occurring heterogeneous nucleation in the strip matrix during the temperature decreasing process. The above process significantly compensates for the deficiency of amorphous performance of the amorphous composition with a high saturation induction composed of only Fe, Si, and B elements. In the present disclosure, concentration of the rare earth element in the iron-based amorphous alloy is 10 ppm≤d≤30 ppm; in some specific embodiments, concentration of the rare earth element in the iron-based amorphous alloy is 15 ppm≤d≤28 ppm; in some specific embodiments, concentration of rare earth element in the iron-based amorphous alloy is 18 ppm≤d≤25 ppm; and more specifically, concentration of rare earth element in the iron-based amorphous alloy is 19 ppm, 20 ppm, 22 ppm, 24 ppm or 25 ppm. In the present disclosure, the rare earth is rare earth well-known to one ordinary skilled in the art, and there is no special restriction for this; for example, the rare earth element is selected from one or more of La, Ce, Nd and Yb; in a specific embodiment, the rare earth element is selected from one or more of La and Ce.

The present application also provides a method for preparing an iron-based amorphous alloy, comprising, preparing raw materials according to atomic percent in the iron-based amorphous alloy of formula $Fe_aSi_bB_c$; smelting the prepared raw materials, and adding a rare earth alloy after a molten steel achieves a target temperature in the smelting process; and performing a single roller rapid quenching on the smelted molten liquid to give an iron-based amorphous alloy;

wherein the addition amount of the rare earth alloy is that concentration of the rare earth elements in the iron-based amorphous alloy is 10 ppm to 30 ppm;

wherein 83.0≤a≤87.0, 11.0<b<15.0, 2.0≤c≤4.0, and a+b+c=100.

In the present application, the Fe, Si, B and RE are specifically added by a method comprising: adding a certain amount of rare earth element in molten steel of Fe, Si and B alloy. Rare earth element is added in high temperature stage to ensure it to melt therein fastly. After the alloy is melted, temperature of the molten steel is lowered to stand the alloy in a low temperature zone for not less than 40 min. The formed oxide slag is removed with a tailored drossing agent. At the same time, after deoxidization and drossing of the rare earth, a certain content of rare earth element solute is allowed in the molten steel. According to the present disclosure, the rare earth element is added at a temperature of 1450 to 1500° C.

After the molten liquid is obtained, it is subjected to a single roller quenching to give an iron-based amorphous alloy.

The iron-based amorphous alloy strip prepared in the present application is in a completely amorphous state, having a critical state of at least 30 μm, and a width of 100 to 300 mm.

In actual use, the iron-based amorphous alloy strip obtained above should be subjected to heat treatment, and temperature of the heat treatment is 300 to 380° C., and time of the heat treatment is 30 to 150 min.

Experimental results show that after heat treatment, under a condition of 50 Hz and 1.30 T, the iron-based amorphous alloy has an iron core loss of less than 0.16 W/kg; and under a condition of 50 Hz and 1.40 T, the iron-based amorphous alloy has an iron core loss of less than 0.20 W/kg. The iron-based amorphous alloy provided by the present disclosure can be used as a magnetic core material of a power transformer, an electrode and an inverter.

In order to understand the present disclosure better, the iron-based amorphous alloy provided in the present disclosure will be described in detail below with reference to the examples. The protection scope of the present disclosure is not limited by the examples hereinafter.

Example Effect Evaluation of Addition of Rare Earth

About 150 kg of molten steel of Fe85Si2.7B12.3 was prepared and smelted with industrial raw materials iron, ferroboron and silicon. Amorphous strips with a thickness of about 20 μm, 30 μm and 40 μm and a width of 80 mm were prepared respectively. The resultants were incubated at a smelting temperature of 1450 to 1500° C. for 5 to 10 min, during which a certain amount of rare earth alloy La or Ce was added. High temperature facilitated fast melting of the rare earth alloy. The rare earth alloy was rapidly drawn into the molten steel, avoiding it to float on the surface of the molten steel and react with oxygen in the air. After the smelting process was completed, the temperature was lowered to 1400 to 1420° C. to standing not less than 40 min. The smooth running property for preparation of the alloy strip was evaluated by adjusting the amount of the rare earth and matching of the casting temperature.

The amorphous forming ability of the material was evaluated by assessing amorphous degree of the amorphous materials in different strip thickness using an X-ray diffractometer. Content of oxidized slag in the nozzle was measured with energy disperse spectroscopy. Content of gas elements in the alloy was measured with an oxygen-nitrogen-hydrogen analyzer. Content of rare earth element in the alloy was measured with a direct-reading spectrometer. The evaluation data was shown in Table 1 below.

TABLE 1

Evaluation of alloy and strip under different smelting conditions

| Group | Addition Amount wt % RE | Casting Temperature/ ° C. | Amorphous Test 40 ± 1 μm | Amorphous Test 30 ± 1 μm | Amorphous Test 20 ± 1 μm | Impurity Elements in the Nozzle/wt % $Al_2O_3$ | $TiO_x$ | $VO_x$ | $RE_2O_3$ | Content of RE ppm | Content of Gas ppm O | N |
|---|---|---|---|---|---|---|---|---|---|---|---|---|
| Inventive Example 1 | 0.005 | 1400 | ✓ | ✓ | ✓ | 0.8 | 0.2 | 0.5 | 0.5 | 18 | 11 | 12 |
| Inventive Example 2 | 0.015 | 1420 | ✓ | ✓ | ✓ | 0.45 | 0.3 | 0.3 | 0.5 | 15 | 14 | 13 |
| Inventive Example 3 | 0.025 | 1410 | ✓ | ✓ | ✓ | 0.5 | 0.2 | 0.2 | 0.3 | 27 | 13 | 14 |
| Comparative Example1 | 0 | 1400 | x | x | ✓ | 5 | 1.2 | 2.3 | 0.02 | 8 | 25 | 21 |
| Comparative Example2 | 0.025 | 1450 | x | x | ✓ | 0.45 | 0.4 | 0.3 | 0.4 | 20 | 14 | 15 |
| Comparative Example3 | 0.03 | 1410 | x | x | x | 0.25 | 0.1 | 0.1 | 0.9 | 45 | 37 | 28 |

Compared with Comparative Example 1 without adding rare earth element, the alloy with addition of rare earth can effectively reduce elements which can form a high melting point, such as Al, V, Ti. If the casting temperature was relatively low and aperture of the nozzle is relatively narrow, the above elements were easy to accumulate at the muzzle, making it hard for smooth running of spraying strip. The accumulated slag caused generation of slag line in the strip preparing process. In severe cases, a branch strip was generated, leading to early termination of spraying strip. Reaction of the rare earth with oxygen reduced the free oxygen in the molten steel, and reduction of the oxygen content can cause reduction of high-melting-point slag. Compared with the test results of the slag content at the nozzle in Comparative Example 1, the addition of rare earth elements in Inventive Examples 1 to 3 can effectively reduce the accumulation of other high melting point slag at the nozzle. On the other hand, the high melting point slag in the strip can also act as a heterogeneous nucleation point to induce crystallization of the strip. According to the XRD test results, in Comparative Example 1, at a casting temperature of 1400° C., the strip was amorphous only when the strip thickness was about 20 μm, and strips with other thicknesses were all crystallized. However, in Inventive Examples 1 to 3, due to strong deoxidization of rare earth elements, they can rapidly react with the dissolved oxygen in the molten steel, and can be effectively removed. Even if a small amount of rare earth oxides participated in, the preparation of strip was not influenced. Because rare earth oxide reacted with part of the silicon dioxide in the alloy, and the reaction can form silicate-like substances, which had an amorphous structure and did not have adverse influences on the formation of an iron-based amorphous matrix.

Larger addition amount of rare earth was not better. As seen from Comparative Example 3, although RE was added in an amount of 0.03%, which was slightly increased compared with the amount added in the Inventive Examples; however, the gas content in the alloy did not decrease, but increased, and was higher than that in Comparative Example 1 in which no rare earth was added. According to our analysis, it is mainly due to that the oxygen-nitrogen analyzer measured the total oxygen content (combined state, single element free state) in the alloy. It also indirectly showed that if the rare earth was added in an unduly large amount, it not only reacted with the free oxygen in the molten steel, but also reacted with the oxygen on the surface of the molten steel, so that after the drossing process was completed, the remain rare earth in the molten steel draw oxygen in the air into the molten steel again, causing too high amount of oxygen and nitrogen. At the same time, rare earth oxide slag in the nozzle and the rare earth elements in the alloy were obviously too high, which also indicated an excessive addition of rare earth. Because time rhythm for spraying strip needed to be properly controlled, and the time left for the reaction of rare earth oxide and silicon dioxide was limited, the excessive residual rare earth oxide was not completely reacted with silicon dioxide to form silicate-like substances, so that it accumulated as a new introduced high melting point slag at the nozzle.

As mentioned in the composition design, the amorphous composition with a high saturation induction containing only three elements Fe, Si, and B are relatively insufficient in amorphous forming ability due to decrease in amorphous forming elements. By reducing the casting temperature of molten steel, reducing the degree of superheat of the molten steel and increasing the relative cooling capacity, the defects of insufficient amorphous forming ability can be remedied. It can be seen from Inventive Example 3 and Comparative Example 2 that when temperature of the molten steel was lowered, maximum amorphous thickness of the strip significantly increased. In summary, suitable addition of rare earth reduced content of other high melting point slag, improved quality of the molten steel, and created possible conditions for strip production at a low temperature.

In view of above, it was suitable to add rare earth in an amount of 0.005 to 0.025%. Considering the difference among raw materials, it can be evaluated that the content of rare earth in the strip was suitable between 15 ppm and 30 pp.

EXAMPLE

1) Evaluation of Alloy Composition on Amorphous Forming Ability

In order to obtain an amorphous alloy with a high saturation induction, especially amorphous strip with a high saturation induction made from three elements of Fe, Si and B, a rational design of the amorphous forming elements and a rational matching of the technological parameters appeared to be particularly important. 30±1 μm strips were used as an evaluation criterion. At a casting temperature below 1420° C., adding a suitable amount of RE elements can obtain amorphous strips with a thickness of around 30 μm, see examples 4 to 9.

TABLE 2

Evaluation of amorphous forming ability of amorphous composition with a high saturation induction

| Group | Alloy Composition/at % Fe | Si | B | Addition Amount/wt % RE | RE content in the alloy | Casting Temperature/° C. | Amorphous Test 30 ± 1 μm | 20 ± 1 μm |
|---|---|---|---|---|---|---|---|---|
| Inventive Example 4 | 83 | 3.2 | 13.8 | 0.01 | 18 | 1420 | ✓ | ✓ |
| Inventive Example 5 | 83.2 | 2.3 | 14.5 | 0.015 | 26 | 1410 | ✓ | ✓ |
| Inventive Example 6 | 84.3 | 3.5 | 12.2 | 0.01 | 16 | 1420 | ✓ | ✓ |
| Inventive Example 7 | 85 | 2.7 | 12.3 | 0.015 | 23 | 1410 | ✓ | ✓ |
| Inventive Example 8 | 85.6 | 2.5 | 11.9 | 0.01 | 17 | 1420 | ✓ | ✓ |
| Inventive Example 9 | 86.5 | 2 | 11.5 | 0.02 | 24 | 1410 | ✓ | ✓ |
| Comparative Example 4 | 83.3 | 3 | 13.7 | 0.04 | 55 | 1400 | x | ✓ |
| Comparative Example 5 | 84.5 | 3 | 12.5 | 0.035 | 49 | 1410 | x | x |
| Comparative Example 6 | 85.3 | 2.7 | 12 | 0.02 | 25 | 1450 | x | ✓ |
| Comparative Example 7 | 87.5 | 1.5 | 11 | 0.015 | 20 | 1400 | x | x |
| Comparative Example 8 | 87.5 | 2.5 | 10 | 0.015 | 18 | 1400 | x | x |

It can be seen from comparison of Comparative Example 6 and Inventive Example 7, which had a similar alloy composition, that by reducing molten steel temperature, amorphous composition with a high saturation induction can produce an amorphous strip with thicker thickness. Comparing Comparative Examples 4-6 with Inventive Examples 4-5, it can be seen that the addition of rare earth in an excessive amount led to increase of rare earth oxide in the strip, which, acting as a nucleation point, would induce crystallization, and was adverse for amorphous formation. In contrast, in Comparative Examples 7 to 8, because the content of Fe element was too high, amorphous forming element was obviously insufficient. Even under technological conditions of lowering casting temperature and rationally adding rare earth alloy, amorphous was not formed with a strip thickness of 20 μm. Rational composition design of an amorphous composition with a high saturation induction and technological conditions matching were the key to obtain an amorphous strip with a high saturation induction.

2) Saturation Magnetic Induction Intensity and Magnetic Properties of Amorphous Alloy Strip Strips with a thickness of 20±1 μm in Table 2 were chosen, which were tested to be completely amorphous strips. The strips were winded to sample rings with an inner diameter of 50.5 mm and an outer diameter of 53.5 to 54 mm. A box-type annealing furnace was used to carry out stress relieving annealing. The annealing was carried out in an argon-protected atmosphere, at a temperature of 300 to 380° C. with an interval of 10° C., for 30 to 150 min. A magnetic field along the strip preparation direction with a magnetic field strength of 1200 A/m was added in the heat treatment process. Strip loss after the heat treatment was measured with a silicon steel tester, and loss values at test conditions of 50 Hz, 1.30 T and 1.40 T were respectively measured. Optimal performance values under the optimal heat treatment conditions were selected, and the test results were shown in Table 3. Amorphous strip with the best annealing performance was subjected to Bs test, and saturation magnetic induction intensity of the annealed amorphous strip was tested using a vibrating sample magnetometer, see Table 3;

| Group | Alloy Composition/at % Fe | Si | B | Addition Amount/wt % RE | RE content in the alloy/ppm | Bs/T | W 1.3/50 (W/kg) | W 1.4/50 (W/kg) |
|---|---|---|---|---|---|---|---|---|
| Inventive Example 4 | 83 | 3.2 | 13.8 | 0.01 | 18 | 1.63 | 0.134 | 0.18 |
| Inventive Example 5 | 83.2 | 2.3 | 14.5 | 0.015 | 26 | 1.64 | 0.145 | 0.194 |
| Inventive Example 6 | 84.3 | 3.5 | 12.2 | 0.01 | 16 | 1.65 | 0.151 | 0.196 |
| Inventive Example 7 | 85 | 2.7 | 12.3 | 0.015 | 23 | 1.67 | 0.157 | 0.198 |
| Inventive Example 8 | 85.6 | 2.5 | 11.9 | 0.01 | 17 | 1.67 | 0.155 | 0.195 |
| Comparative Example 4 | 83.3 | 3 | 13.7 | 0.04 | 55 | 1.63 | 0.186 | 0.289 |

It can be concluded from Inventive Examples 4 to 8 that the saturation magnetic induction intensity of iron-based amorphous alloy materials increased with the content of Fe, and was not lower than 1.63 T in the above examples. Comparing Inventive Example 4 with the Comparative Example 4, which had similar compositions, it can be seen that although addition of rare earth oxides in an excessive amount and their tremendous residual amount in strips had adverse influences on amorphous formation, they had little influences on the saturation magnetic induction intensity of the formed amorphous alloy.

However, the loss value in Comparative Example 4 was obviously large, indicating that tremendous residual amount of rare earth oxides in the strip had adverse influences on the properties. As described above, rare earth oxides reacted with some of the silicon dioxide in the alloy to form silicate-like substances exhibiting an amorphous property in structure, which is consistent with the substrate structure of the strip, and which amorphous structure does not have adverse effects on the properties. However, if rare earth was added in an excessive amount, excessive rare earth oxides would be produced and acted as heterogeneous nucleation points. Even though amorphous alloy had been formed in strip preparing stage, there was adverse influence on the formation of soft magnetism. Therefore, during the stress relief annealing process, as a strong pinning point, rare earth oxides suppress removal of stress and deflection of magnetic domains along the magnetization direction, resulting in poor soft magnetic properties after annealing, increased magnetic flux density, and deteriorated properties.

In view of the above, on the base of rational composition design, matching rational technological requirements is an effective way to prepare amorphous materials with a high saturation induction.

The above description of the embodiments is merely to assist in understanding the method of the present disclosure and its core idea. It should be noted that one of ordinary skill in the art can also make several improvements and modifications to the present disclosure without departing from the principles of the disclosure, and such improvements and modifications are also intended to fall within the scope of the claims of the present disclosure.

The above description of the disclosed embodiments enables one ordinary skilled in the art to make or use the disclosure. Various modifications to these embodiments are obvious to one ordinary skilled in the art, and the general principles defined herein may be implemented in other embodiments without departing from the spirit or scope of the disclosure. Thus, the present disclosure is not limited to the embodiments shown herein, but is to conform to the broadest scope of the principles and novel features disclosed herein.

What is claimed is:

1. A method for preparing an iron-based amorphous alloy, comprising preparing raw materials according to atomic percent in the iron-based amorphous alloy of formula $Fe_aB_bSi_c$;

smelting the prepared raw materials to obtain a molten steel;

adding a rare earth alloy after the molten steel achieves a target temperature in the smelting process to obtain a smelted molten liquid; wherein the target temperature is 1450 to 1500° C.;

after the smelting process, leaving the smelted molten liquid to stand at a casting temperature of 1400 to 1420° C. for not less than 40 min, and performing a single roller rapid quenching on the smelted molten liquid to give an iron-based amorphous alloy;

wherein the rare earth element is selected from the group consisting of La, Ce, Nd and Yb, the addition amount of the rare earth alloy is 0.005 to 0.025 wt % so that concentration of the rare earth elements in the obtained iron-based amorphous alloy is 10 ppm to 30 ppm;

wherein a, b and c respectively represent an atomic percent of corresponding components; $83.2 \leq a \leq 86.8$, $11.0 < b < 15.0$, $2.0 \leq c \leq 4.0$, and $a+b+c=100$;

wherein saturation magnetic induction density of the iron-based amorphous alloy is ≥1.63 T;

wherein the method further comprises after the single roller rapid quenching, subjecting the iron-based amorphous alloy to a heat treatment;

wherein temperature of the heat treatment is 300 to 380° C., and time of the heat treatment is 30 to 150 min;

wherein under a condition of 50 Hz and 1.30 T, the iron-based amorphous alloy has an iron core loss of less than 0.16 W/kg; and under a condition of 50 Hz and 1.40 T, the iron-based amorphous alloy has an iron core loss of less than 0.20 W/kg.

2. The method according to claim 1, wherein the iron-based amorphous alloy is in a completely amorphous state, having a critical state of at least 30 μm, and a width of 100 mm to 300 mm.

* * * * *